United States Patent
Chiang et al.

(10) Patent No.: US 7,215,891 B1
(45) Date of Patent: May 8, 2007

(54) INTEGRATED DRIVING, RECEIVING, CONTROLLING, AND MONITORING FOR OPTICAL TRANSCEIVERS

(75) Inventors: Min-Wen Chiang, Torrance, CA (US); Wenbin Jiang, Thousand Oaks, CA (US); David K. Lewis, Agoura Hills, CA (US); Hsing-Chung Lee, Calabasas, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 769 days.

(21) Appl. No.: 10/456,386

(22) Filed: Jun. 6, 2003

(51) Int. Cl.
*H04B 10/24* (2006.01)
(52) U.S. Cl. ...................... 398/137; 398/195
(58) Field of Classification Search ......... 398/135–139
See application file for complete search history.

(56) References Cited

U.S. PATENT DOCUMENTS

| | | | |
|---|---|---|---|
| 3,258,596 A | 6/1966 | Green | |
| 3,360,650 A | 12/1967 | Lawrence | |
| 3,858,056 A | 12/1974 | Melamed et al. | |
| 4,009,385 A | 2/1977 | Sell | |
| 4,019,048 A | 4/1977 | Maione et al. | |
| 4,047,034 A | 9/1977 | Auphan | |
| 4,074,128 A | 2/1978 | Harris, Jr. et al. | |
| 4,081,670 A | 3/1978 | Albanese | |
| 4,097,731 A | 6/1978 | Krause et al. | |
| 4,101,847 A | 7/1978 | Albanese | |
| 4,158,132 A | 6/1979 | O'Dell | |
| 4,176,401 A | 11/1979 | Lonberger | |
| 4,203,032 A | 5/1980 | Haunstetter et al. | |
| 4,295,226 A | 10/1981 | Dombrowski | |
| 4,310,754 A | 1/1982 | Check, Jr. | |
| 4,313,224 A | 1/1982 | Wakabayashi et al. | |
| 4,344,173 A | 8/1982 | Straus | |
| 4,352,013 A | 9/1982 | Fasig et al. | |
| 4,355,395 A | 10/1982 | Salter et al. | |
| 4,369,525 A | 1/1983 | Breton et al. | |
| 4,385,387 A | 5/1983 | Trimmel | |
| 4,399,566 A | 8/1983 | Roullet et al. | |
| 4,406,996 A | 9/1983 | Oka | |
| 4,415,803 A | 11/1983 | Muoi | |
| 4,443,695 A | 4/1984 | Kitamura | |
| 4,523,089 A | 6/1985 | Maeda et al. | |
| 4,545,078 A | 10/1985 | Wiedeburg | |
| 4,558,465 A | 12/1985 | Siegel et al. | |
| 4,574,249 A | 3/1986 | Williams | |
| 4,580,044 A | 4/1986 | Hongo et al. | |

(Continued)

OTHER PUBLICATIONS

Maxim Integrated Products, 1Gbps, High-Speed Limiting Amplifier with Chatter-Free Loss-of-Signal Detection, MAX3262 Data Sheet, pp. 1-8, Sunnyvale, CA, Rev. Jan. 1995.

(Continued)

*Primary Examiner*—Leslie Pascal
(74) *Attorney, Agent, or Firm*—Allen, Dyer, Doppelt, Milbrath & Gilchrist, P.A.

(57) ABSTRACT

An optical transceiver includes a single integrated circuit chip to integrate the drive, receive, control, and monitoring functions of the optical transceiver. The single chip may further have an advance replacement algorithm and monitoring algorithm for the opto-electronic devices of the optical transmitter and receiver to generate flags and/or an advance replacement indication. Methods, apparatus, and systems are disclosed.

20 Claims, 10 Drawing Sheets

U.S. PATENT DOCUMENTS

| | | | |
|---|---|---|---|
| 4,592,057 A | 5/1986 | Comerford | |
| 4,605,848 A | 8/1986 | Ogawa | |
| 4,612,617 A | 9/1986 | Laplace, Jr. et al. | |
| 4,612,671 A | 9/1986 | Giles | |
| 4,698,809 A * | 10/1987 | Munter | 714/746 |
| 4,709,416 A | 11/1987 | Patterson | |
| 4,718,118 A | 1/1988 | Viola | |
| 4,730,114 A | 3/1988 | Portmann | |
| 4,734,914 A | 3/1988 | Yoshikawa | |
| 4,743,749 A | 5/1988 | Grundy | |
| 4,771,431 A | 9/1988 | Nakazawa et al. | |
| 4,806,873 A | 2/1989 | Nagano | |
| 4,817,098 A | 3/1989 | Horikawa | |
| 4,837,428 A | 6/1989 | Takagi et al. | |
| 4,843,382 A | 6/1989 | Oda et al. | |
| 4,858,219 A | 8/1989 | Yoshikawa | |
| 4,878,225 A | 10/1989 | Aiba et al. | |
| 4,879,459 A | 11/1989 | Negishi | |
| 4,890,288 A | 12/1989 | Inuyama et al. | |
| 4,903,273 A | 2/1990 | Bathe | |
| 4,918,681 A | 4/1990 | Ikeda | |
| 4,945,753 A | 8/1990 | Twombly | |
| 4,954,786 A | 9/1990 | Yamakawa et al. | |
| 4,995,100 A | 2/1991 | Stallard et al. | |
| 5,003,624 A | 3/1991 | Terbrack et al. | |
| 5,019,769 A | 5/1991 | Levinson | |
| 5,027,362 A | 6/1991 | Hokanson et al. | |
| 5,033,061 A | 7/1991 | Hobart et al. | |
| 5,036,189 A | 7/1991 | Geller | |
| 5,046,138 A | 9/1991 | Grubb, III | |
| 5,057,932 A | 10/1991 | Lang | |
| 5,065,456 A | 11/1991 | Nakayama | |
| 5,144,278 A | 9/1992 | Moseley et al. | |
| 5,162,936 A | 11/1992 | Taga et al. | |
| 5,200,597 A | 4/1993 | Eastman et al. | |
| 5,218,225 A | 6/1993 | Zanders | |
| 5,282,074 A | 1/1994 | Miyazaki et al. | |
| 5,297,056 A | 3/1994 | Lee et al. | |
| 5,298,800 A | 3/1994 | Dunlop et al. | |
| 5,311,005 A | 5/1994 | Visocchi | |
| 5,374,973 A | 12/1994 | Maxham et al. | |
| 5,513,029 A | 4/1996 | Roberts | |
| 5,579,328 A | 11/1996 | Habel et al. | |
| 5,769,384 A | 6/1998 | Baumgartner et al. | |
| 5,864,416 A | 1/1999 | Williams | |
| 5,943,152 A | 8/1999 | Mizrahi et al. | |
| 6,006,172 A | 12/1999 | Synder et al. | |
| 6,010,538 A | 1/2000 | Sun et al. | |
| 6,021,947 A | 2/2000 | Swartz | |
| 6,023,147 A | 2/2000 | Cargin, Jr. et al. | |
| 6,064,501 A | 5/2000 | Roberts et al. | |
| 6,115,113 A | 9/2000 | Flockencier et al. | |
| H1881 H | 10/2000 | Davis et al. | |
| 6,560,258 B1 | 5/2003 | McQuilkin | |
| 6,665,498 B1 | 12/2003 | Jiang et al. | |
| 6,955,482 B2 * | 10/2005 | Rosenberg et al. | 385/92 |
| 7,092,604 B2 * | 8/2006 | Edwards et al. | 385/100 |
| 2002/0149821 A1 | 10/2002 | Aronson et al. | |
| 2003/0002109 A1 | 1/2003 | Hochberg et al. | |
| 2003/0091076 A1 * | 5/2003 | Fischer | 372/38.02 |
| 2003/0128411 A1 | 7/2003 | Aronson et al. | |
| 2003/0174747 A1 * | 9/2003 | Wyman et al. | 372/38.01 |
| 2005/0030985 A1 * | 2/2005 | Diaz et al. | 372/29.015 |
| 2005/0169636 A1 * | 8/2005 | Aronson et al. | 398/136 |

OTHER PUBLICATIONS

Dallas Semiconductor, Maxim, DS1848 Dual Temperature-Controlled NV Variable Resistor & Memory Data Sheet, pp. 1-17, Aug. 15, 2002.

Dallas Semiconductor, DS1852 Optical Transceiver Diagnostic Monitor Data Sheet, pp. 1-25, Apr. 3, 2002.

Maxim Integrated Products, Low-Power, 622Mbps Limiting Amplifiers with Chatter-Free Power Detect for LANs, MAX3761/MAX3762 Data Sheet, pp. 1-12, Sunnyvale, CA, Rev. Sep. 1996.

Maxim Integrated Products, 3.2Gbps SFP VCSEL Driver with Diagnostic Monitors, MAX3740 Data Sheet, pp. 1-14, Sunnyvale, CA, Rev. Dec. 2002.

Maxim Integrated Products, Single +5V, Fully Integrated 1.25Gpbs Laser Diode Driver, MAX3261 Data Sheet, pp. 1-12, Sunnyvale, CA, Rev. May 2001.

Bob Mayer, Fiber-Optic Converter Bolster Nets, pp. 1-3, Network World, Jun. 28, 1999.

Peregrine Semiconductor, Peregrine Semiconductor Announces Industry's First 10 GBPS Quad VCSEL Transceiver Optical Engine, Peregrine Semiconductor PRess Release, pp. 1-2, Feb. 28, 2002.

Pergrine Semiconductor Fact Sheet, http://www.pergegrine-semi.com/about_fact.html, pp. 1-3, May 14, 2003.

Computer Graphics World, Peregrine Semiconductor Announces Industry's First 10 GBPS Quad VCSEL Tranceiver Optical Engine, http://cgw.onlineartcles.printthis.clickability.comp/pt/cpt?action-ppt&title=Peregrine+Semiconductor+, 1 page, Mar. 12, 2002.

Peregrine Semiconductors, http://www.amn.org.au/html/casestudy/peregrine.htm., one page, May 12, 2003.

PTAP Prototype Inoformation Sheet, 10 Gbps Quad VCSEL Transceiver Optical Subassembly, http://www.oida.org/PTAP/prototypes/us_5_1.html, 1 page, 2002.

Dallas Semiconductor, DS1851 Dual Temperature-Controlled NV Digital-to-Analog Converters, pp. 1-17, Jan. 2, 2002.

* cited by examiner

INTEGRATED DRIVING, RECEIVING, CONTROLLING, AND MONITORING FOR OPTICAL TRANSCEIVERS

FIELD OF THE INVENTION

This invention relates generally to optical transceivers. More particularly, the invention relates to integrated drive, receive, control and monitoring for optical transceivers.

BACKGROUND OF THE INVENTION

Optical transceivers are used in optical communications systems to convert data from electronics format into optical format and vice versa. A typical optical transceiver comprises a number of separate optical, optical-electrical, and electrical components including a semiconductor laser (LD) or light emitting diode (LED), an LD or LED driver IC, a P-I-N photodiode or Avalanche Photodiode (APD), a trans-impedance amplifier (TIA) and a limiting amplifier (LA). An LD can be a Fabry-Perot (FP) laser, a distributed feedback (DFB) laser, or a vertical cavity surface emitting laser (VCSEL). An LED can be either an edge emitting type or a surface emitting type of LED. These are discrete devices typically packaged separately in device packages, such as a thin outline (TO) can, or integrated circuit packages, such as a j-lead surface mount package.

The semiconductor laser is usually packaged together with a power monitoring photodiode and coupled with a lens system to form a transmission optical sub-assembly (TOSA). The laser driver controls the laser operation and maintains a constant average laser output power through an auto-power control (APC) feedback loop, while modulating the laser to convert electronics data into optical data. The APC feedback loop, associated with the laser driver, compensates for laser power changes due to temperature variations and laser aging. The laser driver IC modulates the LD or LED output power to convert electronics data into optical data.

The P-I-N photodiode is usually packaged together with the TIA in a single package and coupled to a lens system to form a receiver optical subassembly (ROSA). The photodiode receives and converts optical data into electrical data in electric current format, while the TIA converts the input electric current into voltage with linear amplification. The limiting amplifier amplifies and converts the analog input voltage signal from the trans-impedance amplifier into a constant voltage output. The output of the limiting amplifier is usually in either PECL or CML (current mode logic) format. Other features, such as Loss of signal (LOS) detect and squelch function, are usually integrated into the limiting amplifier. LOS indicates if the photodiode is receiving data and squelch function completely shuts down the data output from LA when the input signal falls below a predetermined level. The laser driver and LA, along with APC loop and other passive circuit elements, are electrical components that are mounted onto a printed circuit board (PCB) called electrical subassembly (ESA).

The APC can be implemented with either analog or digital resistors to form a feedback loop by monitoring the laser output power through the monitoring photodiode mounted inside the laser package. Alternatively, a microprocessor can be used along with an A/D converter in connection with the laser monitoring photodiode and a D/A converter in connection with the laser driver to control the laser bias current, thus to set the laser average output power at constant. The same microprocessor can also be used to control the modulation amplitude of the laser driver, thus to control the laser operation extinction ratio.

Sometimes, it is desirable to monitor certain operational parameters of the optical transceivers, such as laser bias current, laser average output power, average power or optical modulation amplitude received by the receiver, voltage applied to the transceiver and transceiver temperature. This monitoring capability can be achieved through a digital monitoring controller that includes a few A/D converters, non-volatile memory, SRAM, memory mapping, lookup table, and digital communication interfaces, such as a serial interface. The same monitoring functionality can alternatively be accomplished through the use of micro-controllers along with some non-volatile memory. The monitoring circuitry and microprocessor or micro-controller being electrical components, are mounted with the laser driver and LA, along with APC loop and other passive circuit elements, are onto the same printed circuit board (PCB) to become part of the electrical subassembly (ESA).

The monitoring circuitry and microprocessor or micro-controller has increased the number of circuit elements mounted to the printed circuit board and increased optical transceiver costs and the requirement for PCB area. With an increased usage of PCB area to provide the increased functionality, it makes it more difficult to reduce the size of the optical transceiver. Additionally, the increased number of circuit elements increases power consumption for a given optical transceiver. Moreover, as optical transceivers contribute to overall system hardware costs, it is desirable to improve over the prior art.

BRIEF SUMMARY OF THE INVENTION

Briefly, the invention is described in the claims.

In one embodiment a single integrated circuit chip is provided within an optical transceiver. The single integrated circuit chip includes a laser driver, a limiting amplifier, and a micro-controller coupled together on a single integrated circuit substrate. The laser driver generates a DC bias current to bias a semiconductor laser to at least a laser threshold and generates a modulating current to modulate the semiconductor laser in response to a serial transmission data pattern. The limiting amplifier amplifies irregular low voltage amplitude received signals from a photodetector and generates a received data signal with a regular voltage amplitude. The regular voltage amplitude are known expected logic levels such at TTL, CMOS, LVCMOS, LVTTL, etc. The micro-controller is coupled to the laser driver and the limiting amplifier. The microcontroller controls and monitors the operation of the laser driver and the limiting amplifier. By monitoring the laser driver and the limiting amplifier, a measure of how the optical transceiver is operating may be obtained and failures may be detected in advance. The laser driver is controlled by the micro-controller to maintain a constant average laser output power and to compensate for operational temperature variations and laser aging in one embodiment. In another embodiment, the laser driver is controlled by the micro-controller to operate the semiconductor laser at a pre-determined extinction ratio in response to operational temperature variations and laser aging.

The limiting amplifier generates an output differential data output with output levels of one of the set of current mode logic (CML) and positive emitter coupled logic (PECL). The limiting amplifier further detects a loss of signal in the irregular low voltage amplitude received signal and in response generates a loss of signal flag output with output levels of one of the set of transistor—transistor logic (TTL) levels and positive emitter coupled logic (PECL) levels. The limiting amplifier further includes a squelch function to suppress an output differential data output when the irregular low voltage amplitude received signal is below a pre-determined level.

The micro-controller may be programmed with instructional code to provide operational status of the optical transceiver. The operation status of the optical transceiver includes one or more monitored transceiver parameters of the set of laser average output power, laser bias current, received optical power by a photodiode in the said transceiver, transceiver bias voltage, and transceiver operation temperature. The micro-controller may be further programmed to provide a warning and a flag output to indicate the failing of one or more of the monitored transceiver parameters. The micro-controller provides an electrical interface to a host system. In one embodiment, the electrical interface is a two-wire communication interface to communicate with a host system. In other embodiments, the communication interface is a serial interface.

In one embodiment, the laser driver is a variable laser driver having a wide driving flexibility and can be set to drive one of a plurality of semiconductor lasers. The variable laser driver can be set to drive one of a vertical cavity surface emitting laser (VCSEL), a Fabry-Perot (FP) laser, and a distributed feedback (DFB) laser. In another embodiment, the laser driver has a selectable output mode including a first output mode and a second output mode, the output mode being selected in response to the selection of laser diode and the connection between packaging pins of the single integrated circuit chip and pins of the laser diode. The first output mode of the laser driver is to drive vertical cavity surface emitting lasers, and the second output mode of the laser driver is to drive Fabry-Perot (FP) lasers and distributed feedback (DFB} lasers. The laser driver can operate over a wide range of data rates from 100 Mbps through 4.5 Gbps. Similarly, the limiting amplifier can operate over a wide range of data rates from 100 Mbps through 4.5 Gbps in one embodiment. In another embodiment, the limiting amplifier operates over data rates from 1 Gbps through 4.5 Gbps. The limiting amplifier includes a rate selection pin to switch in a bandwidth limiting filter in order to operate at a data rate of less than 2.5 Gbps or 1.3 Gbps. In another embodiment, an electric subassembly (ESA) is included as part of an optical transceiver. The electric subassembly (ESA) includes an optical transceiver integrated circuit and a non-volatile memory integrated circuit. The optical transceiver integrated circuit is a single device that integrates a laser driver, a limiting amplifier, and a micro-controller coupled together in a single semiconductor substrate. The optical transceiver integrated circuit couples to a transmit optical subassembly (TOSA) and a receive optical subassembly (ROSA) of the optical transceiver in order to transceive data signals over an optical data link. The non-volatile memory integrated circuit is coupled to the optical transceiver integrated circuit in order to store information related to the operation of the optical transceiver in a non-volatile manner so that it is not lost when power is shut off or lost to the optical transceiver. The non-volatile memory integrated circuit may additionally be used to store micro-controller program coding and transceiver operational parameters.

The optical transceiver integrated circuit has a silicon or silicon germanium semiconductor substrate. In one embodiment, the laser driver, the limiting amplifier, and the micro-controller of the optical transceiver integrated circuit are formed by a bipolar-complementary metal oxide semiconductor (Bi-CMOS) process using bipolar junction transistors (BJTs) and metal oxide semiconductor field effect transistors (MOSFETs) in the silicon or silicon germanium semiconductor substrate.

In another embodiment, an integrated circuit is used in optical transceivers. The integrated circuit includes one or more analog-to-digital converters, a memory, and a micro-controller coupled to the memory and the one or more analog-to-digital converters. The one or more analog-to-digital converters are used to digitally monitor one or more laser diode operational parameters and one or more photo-detector operational parameters. The memory is used to store a first sequence of the one or more laser diode operational parameters and of the one or more photodetector operational parameters. The micro-controller generates an advance replacement indicator in response to one or more of the one or more laser diode operational parameters and one or more photodetector operational parameters stored in the memory and in further response to one or more current laser diode operational parameters and one or more current photodetector operational parameters generated by the one or more analog-to-digital converters.

A non-volatile memory may couple to the micro-controller to store a unique identifier identifying the optical transceiver, an advanced replacement flag, a failed flag, and a reason indicator indicating a failure mechanism if the advanced replacement flag or the failed flag is set.

The integrated circuit may further include a digital data input/output port to transfer the one or more laser diode operational parameters stored in the memory to a host system and to transfer the one or more current laser diode parameters from the one or more A/D converters to the host system so the host system can perform an advanced replacement algorithm to determine when to replace the optical transceiver in advance of a failure. The digital data input/output port may further allow the host to access the non-volatile memory to store a unique identifier identifying the optical transceiver. The digital data input/output port may further allow the host to access the non-volatile memory to read any advanced replacement flag, failed flag, and any reason indicator.

The integrated circuit may further include a status/control input/output port to read status of the integrated circuit and to store input output control parameters. The status/control input/output port may further allow the host to access the non-volatile memory and read any advanced replacement flag, failed flag, and any reason indicator.

In another embodiment, a method for an optical transceiver is disclosed. The method includes monitoring a sequence of laser diode parameters for a laser diode within the optical transceiver; determining a change in the sequence of laser diode parameters to provide an advanced warning of failure; and generating an advance replacement indicator for the optical transceiver in response to determining a change in the sequence of laser diode parameters. The method may further include storing the advanced replacement indicator in the optical transceiver so it is not lost when the optical transceiver is swapped out. Alternatively or conjunctively, the method may further include storing a reason indicator in the optical transceiver indicating the reason why the advanced replacement indicator may be set so it is not lost when the optical transceiver is swapped out. The advanced replacement indicator and the reason indicator may be stored in a nonvolatile memory within the optical transceiver so they are not lost when power is disconnected. In one embodiment, the advanced replacement indicator and the reason indicator are generated by an advanced replacement algorithm programmed into a microcontroller. In yet another embodiment, the sequence of laser diode parameters are stored in a hard disk drive of a host system and the host system determines the change in the sequence of laser diode parameters to provide an advanced warning of failure and generates the advance replacement indicator for the optical transceiver in response thereto.

In another embodiment, a replacement method for optical transceivers in advance of failure is disclosed as program code stored in a processor readable storage medium. The replacement method includes monitoring a sequence of laser current values for a laser diode within an optical transceiver; monitoring a sequence of laser temperature values for the laser diode within the optical transceiver; monitoring optical power output for the laser diode within the optical transceiver; monitoring the number of times the laser diode has been turned on and off; monitoring the cumulative period of time the laser diode has been turned on; monitoring the cumulative period of time the laser diode has been turned off; monitoring the cumulative time the optical transceiver has been powered on; monitoring a bit error rate; determining a change in one of the laser diode parameters being monitored to provide an advanced warning of failure; and generating an advance replacement indicator for the optical transceiver in response to determining a change in the sequence of laser diode parameters.

In yet another embodiment, another replacement method for optical transceivers in advance of failure is disclosed. The replacement method includes monitoring a sequence of photodetector current values for a semiconductor photodetector, monitoring a sequence of temperature values for the transceiver, monitoring a measure of the optical power received by the photodetector, monitoring the number of times the photodetector has been turned on and off by a received optical signal, monitoring the cumulative period of time the photodetector has been turn on, monitoring the cumulative period of time the photodetector has been turned off, monitoring the cumulative time the optical transceiver has been powered on, monitoring a bit error rate, determining a change in any one of the photodetector parameters being monitored to provide an advanced warning of failure, and setting a flag to indicate that the optical transceiver should be replaced in advance of its failure in response to determining a change in the sequence of photodetector operational parameters.

In still yet another embodiment, the replacement methods for optical transceivers in advance of failure are combined.

In another embodiment, fiber optic network equipment is disclosed including an optical transceiver, a microprocessor electrically coupled to the optical transceiver, and a hard disk drive coupled to the microprocessor. The optical transceiver monitors a sequence of laser diode parameters of a laser diode transmitter therein. The microprocessor reads the sequence of laser diode parameters from the optical transceiver and stores them in hard disk drive. The fiber optic network equipment of further includes a processor readable storage medium that the microprocessor reads to determine a change in the sequence of laser diode parameters in order to provide an advanced warning of failure and generate an advance replacement indicator for the optical transceiver in response to determining a change in the sequence of laser diode parameters.

In yet another embodiment, a computer software product including a medium readable by a processor is disclosed. The medium has stored thereon a sequence of instructions which, when executed by the processor, cause the processor to store a sequence of laser diode parameters received from an optical transceiver; determine a change in the sequence of laser diode parameters to provide an advanced warning of failure; and to generate an advance replacement indicator for the optical transceiver in response to determining a change in the sequence of laser diode parameters.

In yet another embodiment, an article of manufacture is disclosed including a computer useable medium having computer readable program code embodied therein, the computer useable medium including, computer readable program code to receive a sequence of laser diode parameters from an optical transceiver; computer readable program code to determine a change in the sequence of laser diode parameters to provide an advanced warning of failure; and if the change in the sequence of laser diode parameters provides an advanced warning of failure, then computer readable program code to generate an advance replacement indicator for the optical transceiver. The computer useable medium may be a magnetic storage medium, an optical storage medium or a semiconductor storage medium.

BRIEF DESCRIPTIONS OF THE DRAWINGS

DETAILED DESCRIPTION

In the following detailed description of the invention, numerous specific details are set forth in order to provide a thorough understanding of the invention. However, one skilled in the art would recognize that the invention may be practiced without these specific details. In other instances well known methods, procedures, components, and circuits have not been described in detail so as not to unnecessarily obscure aspects of the invention.

There is a continuous push in the industry for higher integration, denser port counts, lower power consumption, and lower component cost. It is therefore the purpose of this invention to integrate the typical separate integrated circuit chips, such as the laser driver, limiting amplifier and microcontroller, into a single integrated circuit chip to simplify the design and manufacturing, and thus reduce the cost of the optical transceivers. It is further the purpose of this invention to reduce the power consumption of the optical transceivers. It is further the purpose of this invention to increase the density of the system port counts by reducing the size of the module by reducing the number and sizes of the integrated circuit chips on a printed circuit board forming the ESA.

Previously discrete IC chips were part of the ESA, such as an LD or LED driver, limiting amplifier (LA) and a micro-controller. Those discrete chips were often designed and manufactured separately with different IC processes. Moreover, each was separately tested and packaged adding up to the overall component cost.

Figure 1:
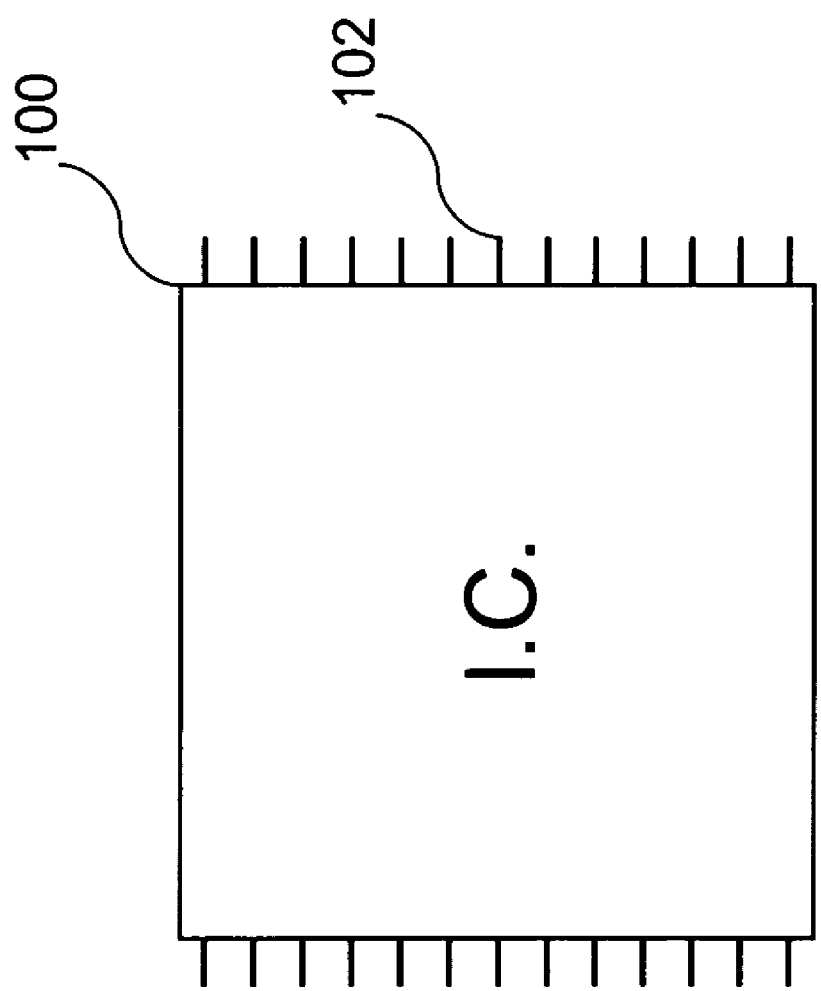
FIG. 1 is a block diagram of a single integrated circuit 100 incorporating the invention.

Referring now to FIG. 1, the invention integrates the laser driver, the limiting amplifier, micro-controller core, analog to digital (AD) converters, and digital to analog (DA) converters into a single chip 100 having the same integrated circuit manufacturing process, such as a silicon-germanium (SiGe) or a silicon (Si) complementary metal-oxide semiconductor (CMOS) transistor or bipolar-complementary metal-oxide semiconductor (Bi-CMOS) transistor process. The single chip 100 is a mixed signal integrated circuit combining analog and digital circuits and signals together. The integrated circuit 100 has a single set of pins 102 some of which receive and/or transmit analog signals while others receive and/or transmit digital signals. Integrating the functionality of the prior discrete components into the single chip 100 may allow for a reduced total number of pins 102 over that of a typical optical transceiver with monitoring functionality. This single chip 100 includes all the typical separate features and functions of a laser driver, a limiting amplifier and digital monitoring functions, as well as all of the laser control capability.

Figure 2:
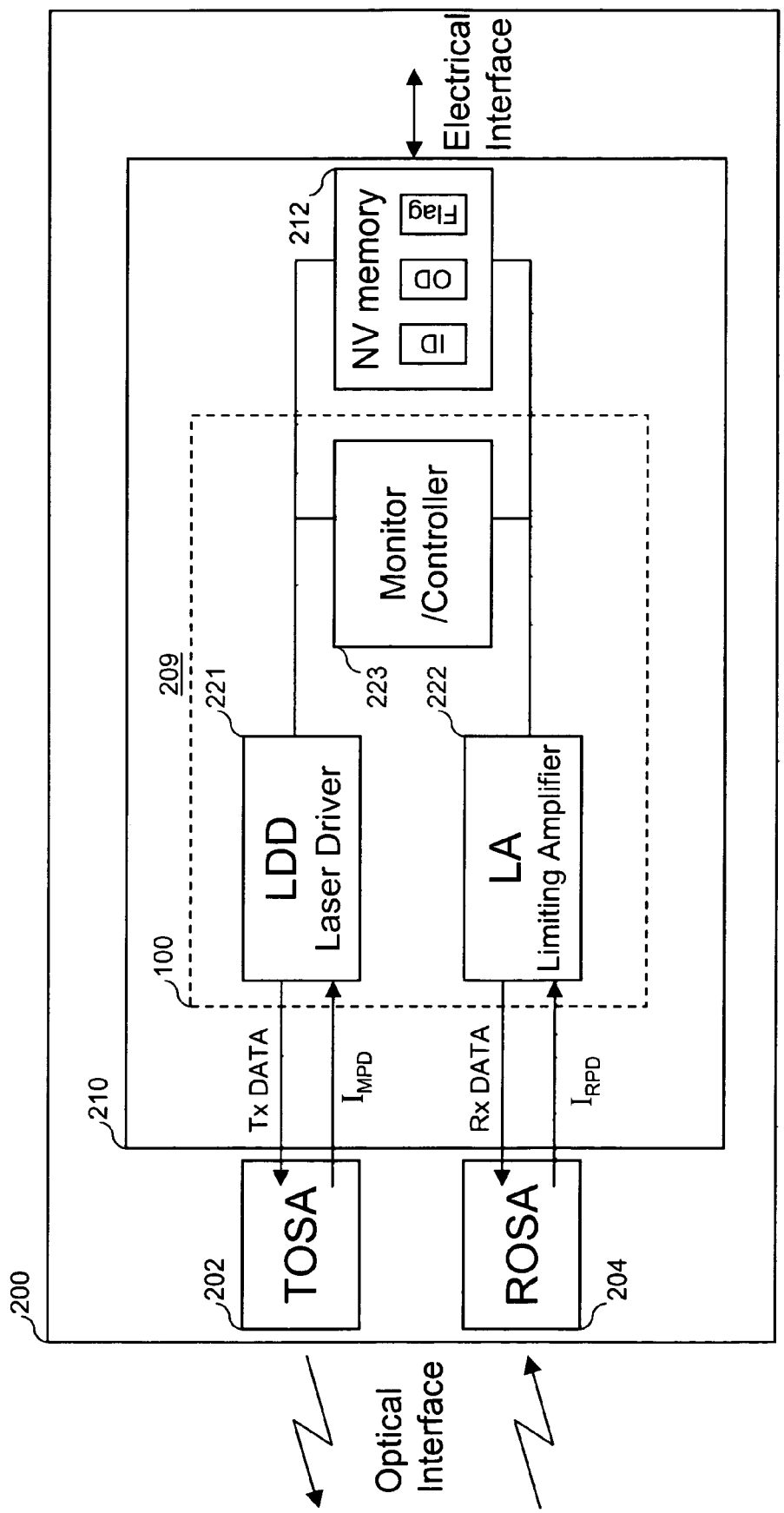
FIG. 2 is a functional block diagram of an optical transceiver 200 incorporating the invention.

Referring now to FIG. 2, a fiber optic module or optical transceiver 200 is illustrated incorporating the integrated circuit 100. The optical transceiver 200 includes a transmitter optical sub-assembly (TOSA) 202, a receiver optical sub-assembly (ROSA) 204, and a printed circuit board 209 with the integrated circuit 100 mounted thereto forming an electrical sub-assembly (ESA) 210. The integrated circuit 100 integrates the drive, receive, control, and monitoring functions of both receive and transmit channels of an optical transceiver into a single electrical device.

The printed circuit board 209 and the ESA 210 may also have a non-volatile memory 212 mounted thereto and coupled to the integrated circuit 100 in order to store information after power is disconnected or shut off to the optical transceiver 200.

The integrated circuit 100 includes internal random access memory (RAM) and internal read only memory (ROM) for internal code and data storage as these types of memory are compatible with the processes used to integrate the operational functions of the transceiver. However, non-volatile random access memory is not included with the single integrated circuit chip 100, as it requires a more expensive semiconductor process technology and because off-the-shelf low cost non-volatile memory 212 can be better utilized for external code and data storage.

The optical transceiver 200 has an optical interface at one end provided by the TOSA 202 and the ROSA 204 and an electrical interface at another end provided by the ESA 210. The electrical interface is provided to bi-directionally communicate with a host system as is discussed further below.

The integrated circuit 100 further includes an LD or LED driver 221 to drive a VCSEL, FP, DFB or LED, a limiting amplifier (LA) 222, and a digital monitor/controller 223 coupled to the driver 221 and the LA 222. The digital monitor/controller 223 includes an AD converter, a microcontroller, and a DA converter as well as the RAM and ROM described previously. The integrated circuit 100 and its subcomponents are designed and manufactured into a single integrated circuit die using the same process technology, as previously described.

The digital monitor/controller 223 provides the electrical interface of the optical transceiver. The electrical interface may be in the form of an edge connection of the PCB 209, a plug coupled to the PCB 209, or solderable pins or surface mounting bumps coupled to the PCB 209.

Figure 3:
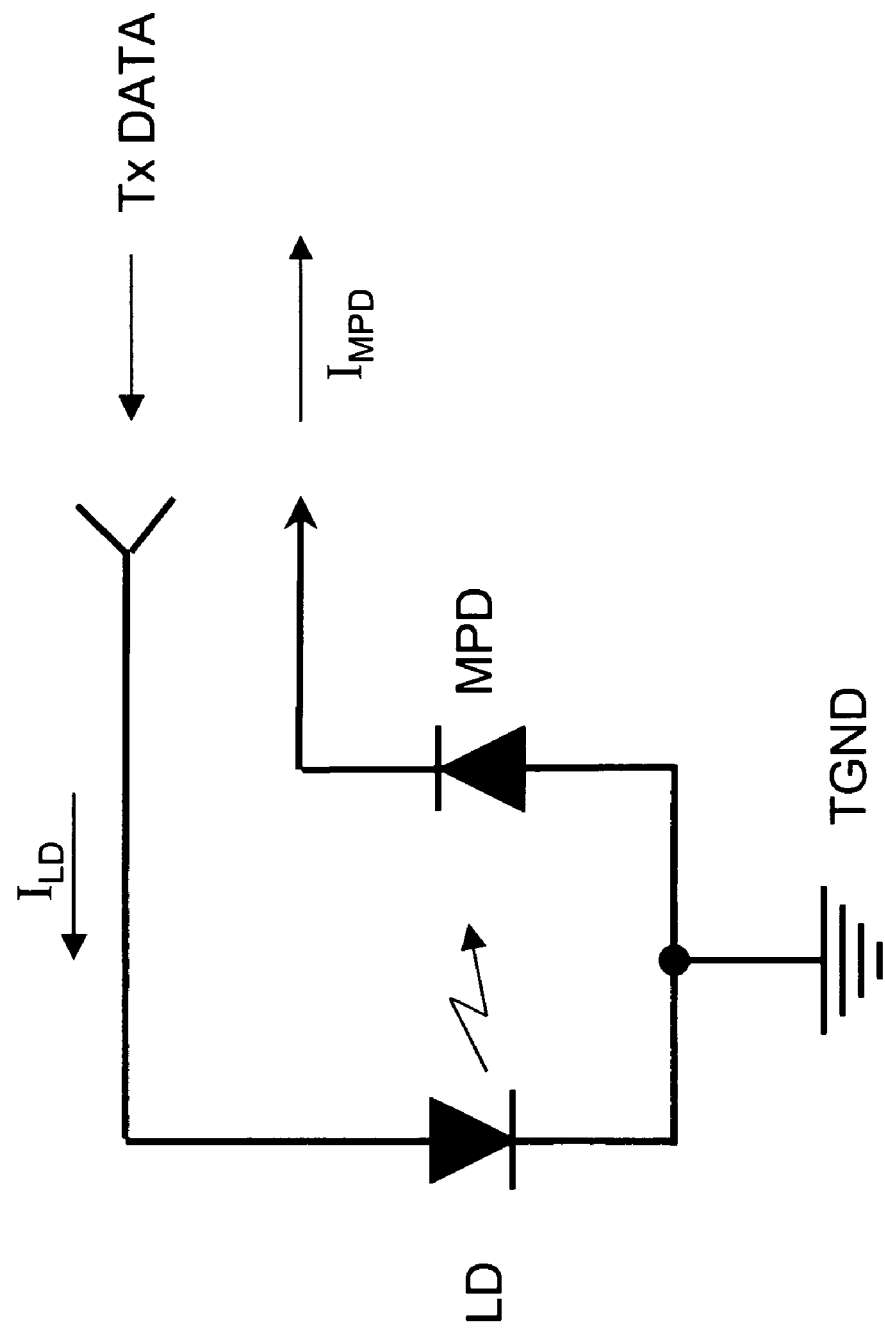
FIG. 3 is a schematic diagram of an exemplary optical transmitter of the transmitter optical sub-assembly (TOSA) 202.

The integrated circuit 100 is bi-directionally coupled to the TOSA 202 by its driver 221. Referring momentarily to FIG. 3, a schematic of an exemplary TOSA 202 is illustrated. Transit data (Tx DATA) modulated onto a carrier wave from the integrated circuit 100 is coupled into the laser diode LD and generates an optical signal out from the TOSA 202. A portion of the optical signal is directed towards a monitoring photodiode MPD while the remaining portion is coupled into a fiber optic cable (FOC). A monitoring current IMPD is coupled from the MPD into the integrated circuit 100. The feedback provided by the monitoring current IMPD to the integrated circuit 100 allows for automatic power control of the laser diode LD.

The laser diode LD has a laser diode current ILD formed out of a DC current IDC and a modulation current IMOD input into the laser diode LD. In the case of LED, modulation current can be applied directly without any DC current bias IDC. The integrated circuit 100 sets the DC current IDC for the given laser diode LD near its laser threshold. As discussed further below, this can be varied depending upon the type of laser diode LD employed. The integrated circuit 100 generates the modulation current IMOD input into the laser diode LD to cause it to periodically lase in response to the transmit data TX Data. That is, the laser diode LD is modulated to generate a modulated optical output. The level of the modulation current IMOD input into the laser diode LD can also be calibrated and adjusted by the integrated circuit 100 to maintain an average optical output power out from a given optical transceiver at a level dependent on the link optical output power budget requirement of the optical transmission system.

Figure 4:
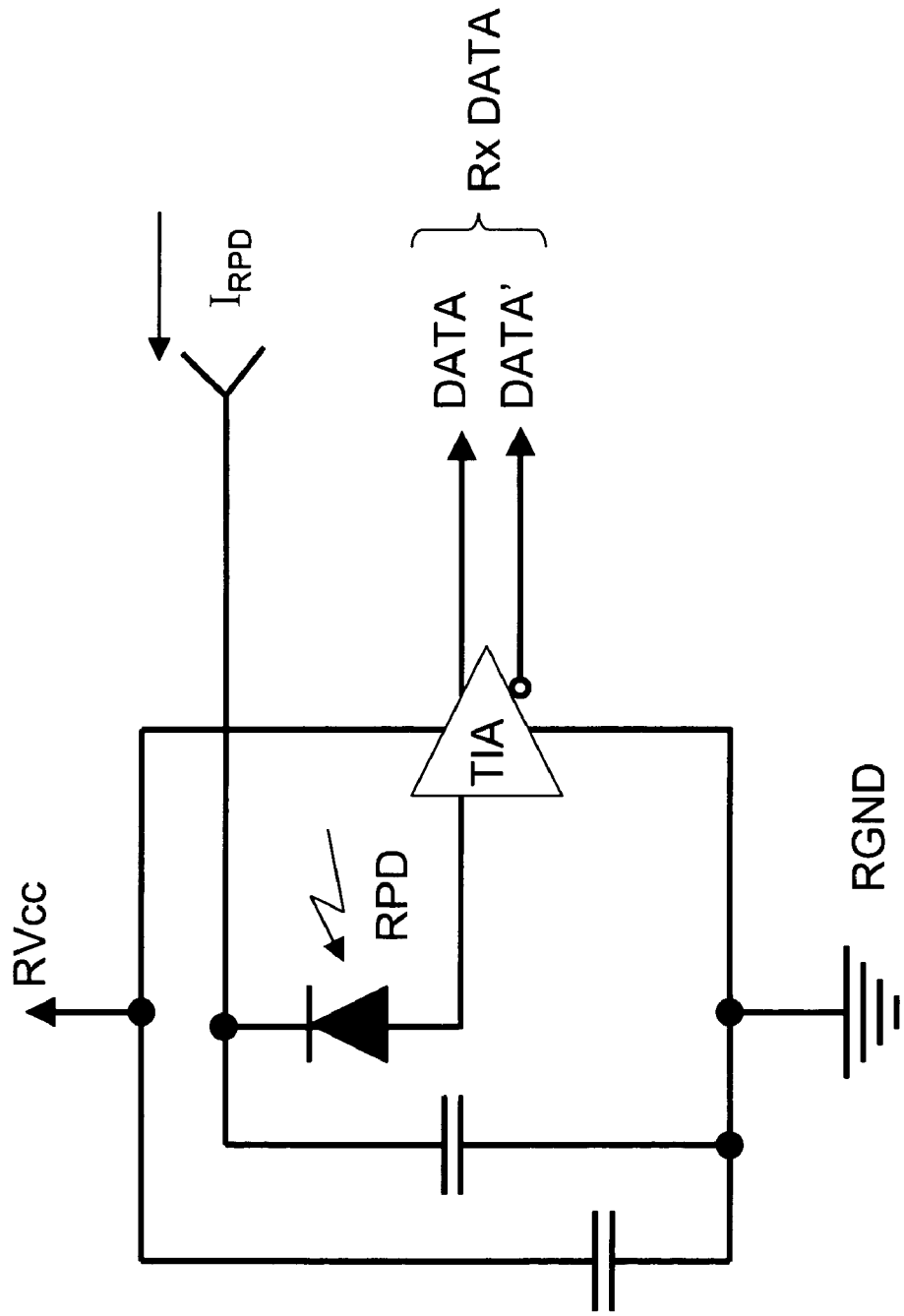
FIG. 4 is a schematic diagram of an exemplary optical receiver of the receiver optical sub-assembly (ROSA) 204.

The integrated circuit 100 is bi-directionally coupled to the ROSA 204 by its LA 222. Referring momentarily to FIG. 4, a schematic of an exemplary ROSA 204 is illustrated. An optical signal is coupled from a fiber optic cable (FOC) into the receive photo-detector RPD. In one embodiment, the RPD is a P-I-N photodiode. A photo-detector current IRPD is generated by the RPD and coupled into the integrated circuit 100. The optical signal with a modulated data signal, generating the photo-detector current IRPD, is coupled through the RPD and into the trans-impedance amplifier TIA. The TIA generates a differential signal between Data and Data' representing the received data (Rx Data) which is coupled into the LA 222 of the integrated circuit 100.

Referring now back to FIG. 2, the integrated circuit chip 100 may couple to the external non-volatile memory 212 to externally store code and data for use with it. The external non-volatile memory 212 may also be used to provide non-volatile storage of information ordinarily stored within volatile random access memory within the integrated circuit 100. In this case, the external non-volatile memory 212 acts as a shadow RAM for the volatile RAM within the integrated circuit 100. The non-volatile memory 212 may be an EEPROM or an EPROM to store operational data (OD), flags (FLAG), and an identifier (ID) of the optical transceiver. In one embodiment, the identifier is a serial number of the optical transceiver. In another embodiment, the identifier may indicate or further indicate the location of a channel and a host system where the optical transceiver is operational.

The single integrated circuit chip 100 performs the functions of driving and modulating a semiconductor laser or LED with controllable average output power and extinction ratio, interfacing with the TIA to generate a constant output voltage on the receiving end, monitoring the transceiver output performances, including the laser average output power, laser bias current, received input optical power or optical modulation amplitude, transceiver operation temperature, and transceiver bias voltage. The single integrated circuit chip 100 has a loss of signal (LOS) feature, a squelch function, and warning and flagging outputs. Due to the implementation of a micro-controller core in the single integrated circuit chip, the chip 100 is versatile and flexible and can allow additional custom features to be implemented, other than automatic power control (APC), programmable control, and memory mapping.

Figure 5:
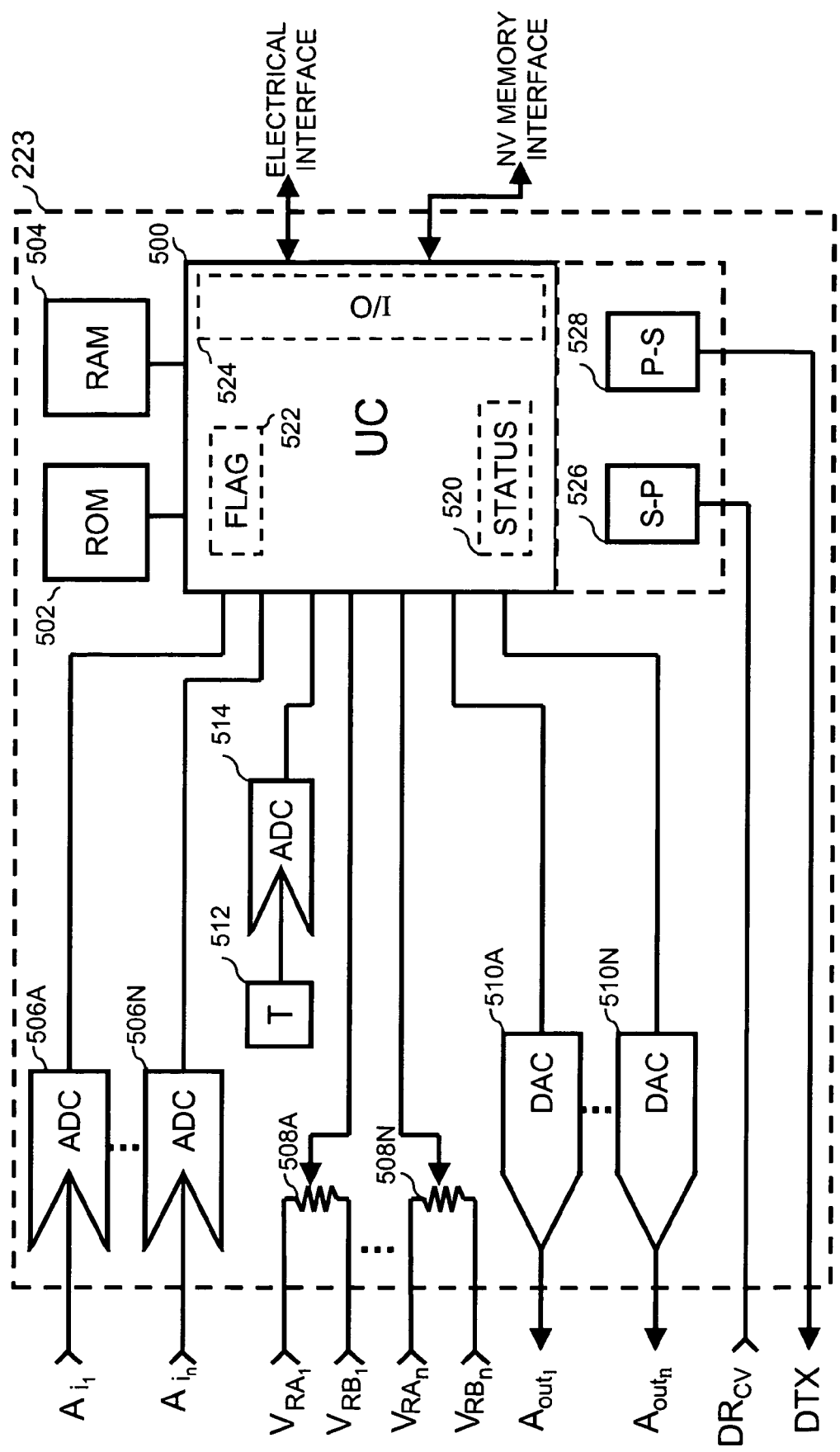
FIG. 5 is a functional block diagram of the monitor/controller 223 of the integrated circuit 100.

Referring now to FIG. 5, a functional block diagram of the monitor/controller 223 is illustrated. The monitor/controller 223 provides a digital input/output interface for the electrical interface of the optical transceiver and an address/data NV memory interface to interface to the external NV memory 212. The monitor/controller 223 also provides an analog interface and a serial digital interface for the driver 221 and the LA 222, as needed.

The monitor/controller 223 includes a micro-controller core (UC) 500 to provide programmable control of the optical transceiver. Coupled to the micro-controller core 500, the monitor/controller 223 further includes a read only memory (ROM) 502, a random access memory (RAM) 504, one or more analog-to-digital converters (ADC) 506A–506N, one or more digital potentiometers (POTS) 508A–508N, and one or more digital-to-analog converters (DAC) 510A–510N. For central temperature sensing of transceiver operation temperature, the monitor/controller 223 may further include a temperature sensor 512, such as temperature sensor resistor, and another analog-to-digital converter (ADC) 514 coupled between the temperature sensor 512 and the micro-controller core 500. The monitor/controller 223 may further include a serial-to-parallel converter/data demodulator 526 to interface with the LA 222, and a parallel-to-serial converter/data modulator 528 to interface with the laser driver 221 as part of the microcontroller core 500 or as elements a part from the microcontroller core 500.

The monitor/controller 223 may be used to provide a digital feedback loop via at least one of the one or more ADC 506A–506N, the micro-controller core 500, and setting at least one of the one or more DAC 510A–510N. Alternatively, monitor/controller 223 may be used to digitally calibrate and adjust analog feedback loops by way of at least one or the one or more ADC 506A–506N, the micro-controller core 500, and setting at least one of the one or more POTS 508A–508N. The monitor/controller 223 may alternatively be used to provide a combination of control over analog feed back loops and digital feedback loops. The feedback loops may be used to provide calibration, automatic power control (APC), maintain voltage references, and provide proper biasing for the laser driver 221 and the LA 222 in order to compensate for operational variations in the optical transceiver, including the ROSA and the TOSA.

Moreover, the monitor/controller 223 may be used to provide central monitoring and diagnosis of both the ROSA and the TOSA and the operation status of the optical transceiver. The one or more analog-to-digital converters (ADC) 506A–506N of the monitor/controller 223 may be used to perform the monitoring and convert analog values into digital values thereof for use by the microcontroller. The monitor/controller 223 may monitor one or more monitored transceiver parameters including laser average output power, laser bias current, received optical power by the photodetector in the ROSA of the transceiver, transceiver bias voltage, and transceiver operation temperature. The micro-controller includes registers that may be designated as flag level registers (FLAG) and status registers (STATUS). The status registers are used for monitoring the operational parameters of the optical transceiver. The flag level registers are used to store predetermined values which are used to compare against the operational parameters which are periodically stored in the status registers. The micro-controller performs the comparison. The micro-controller may or may not generate a flag signal in response to the comparison depending upon whether an operational parameter is above, below a flag level or outside or inside of a range of flag levels stored in the flag level registers. The flag may be directly communicated to a host system over the electrical interface and/or stored in the status register for later polling by the host system over the electrical interface.

The ROM 502 may be used to store program code for the microcontroller 500. The program code may be used to implement algorithms for driving data into the semiconductor laser by the laser driver 221, receiving data from the photodetector by the LA 222, controlling the operation of the optical transceiver, and monitoring operational parameters of the optical transceiver and diagnosing whether the operational parameters exceed flag levels or not.

The program code may also be used to generate an advanced replacement indicator or flag to indicate that the optical transceiver should be replaced before a failure may occur. The integrated circuit and program code may monitor a sequence of laser current values for the semiconductor laser diode, monitor a sequence of laser temperature values for the semiconductor laser diode, monitor a measure of the optical power output from the semiconductor laser diode, monitor the number of times the laser diode has been turned on and off, monitor the cumulative period of time the laser diode has been turn on to lase, monitor the cumulative period of time the laser diode has been turned off, monitor the cumulative time the optical transceiver has been powered on, monitor a bit error rate, and determine a change in any one of the laser diode parameters being monitored to provide an advanced warning of failure, and then set a flag or indicator to indicate that the optical transceiver should be replaced in advance of its failure in response to determining a change in the sequence of laser diode operational parameters.

Alternatively or in conjunction with the monitoring of the laser diode operational parameters to detect a failure in advance of its occurrence, a sequence of photodetector operational parameters may be monitored to detect a failure in advance of its occurrence. The integrated circuit and program code may monitor a sequence of photodetector current values for the photodetector, monitor a sequence of temperature values for the semiconductor photodetector, monitor a measure of the optical power received by the photodetector, monitor the number of times the photodetector has been turned on and off by a received optical signal, monitor the cumulative period of time the photodetector has been turn on, monitor the cumulative period of time the photodetector has been turned off, monitor the cumulative time the optical transceiver has been powered on, monitor a bit error rate, and determine a change in any one of the photodetector parameters being monitored to provide an advanced warning of failure, and then set a flag or indicator to indicate that the optical transceiver should be replaced in advance of its failure in response to determining a change in the sequence of photodetector operational parameters.

These past sequences of stored operational parameters can be measured against current operational parameters monitored by the chip 100 to detect a change and indicate a failure in advance. Alternatively, the past sequences and the current monitored parameters may be passed to a host system to compare and measure the current parameters against the stored sequence and generate a advanced replacement indicator or flag.

In either case, the method includes monitoring a sequence of operational parameters of one or both of the semiconductor laser diode and semiconductor photodetector within the optical transceiver; determining a change in the sequence of the monitored operation parameters to provide an advanced warning of failure; and generating an advance replacement indicator for the optical transceiver in response to determining a change in the sequence of laser diode parameters. Besides generating an advance replacement indicator, the method can further indicate the reason why the advanced replacement indicator may be set by a reasoning code stored in the STATUS registers and backed up by the external non-volatile (NV) memory 212.

Data can be modulated over the optical link in a number of ways. The program code may also be used to flexibly change how data is modulated onto the optical link and demodulated therefrom.

The RAM 504 coupled to the microcontroller 500 may be used to buffer data that is to be transmitted or which has been received, and temporarily store intermediate results or computations. The micro-controller 500 may include a direct memory access circuit so that a host system may DMA data into and out of the optical transceiver. The electrical interface provided by the micro-controller 500 and the monitor/controller 223 to a host system may be a serial data interface or alternatively a parallel data interface. Similarly, the micro-controller 500 may include a serial interface to bidirectionally communicate data with the laser driver 221, the LA 222 as well as the external non-volatile (NV) memory 212.

The microcontroller 500 includes the input/output interface (I/O) to provide a portion of the electrical interface of the optical transceiver. The input/output interface may be configured to support various I/O standards including single ended TTL, CMOS, LVTTL, LVCMOS, ECL, or PECL as well as double ended differential signal outputs TTL, CMOS, LVTTL, LVCMOS, ECL, PECL, and the low voltage swing differential output levels such as LVDS and CML.

Figure 6:
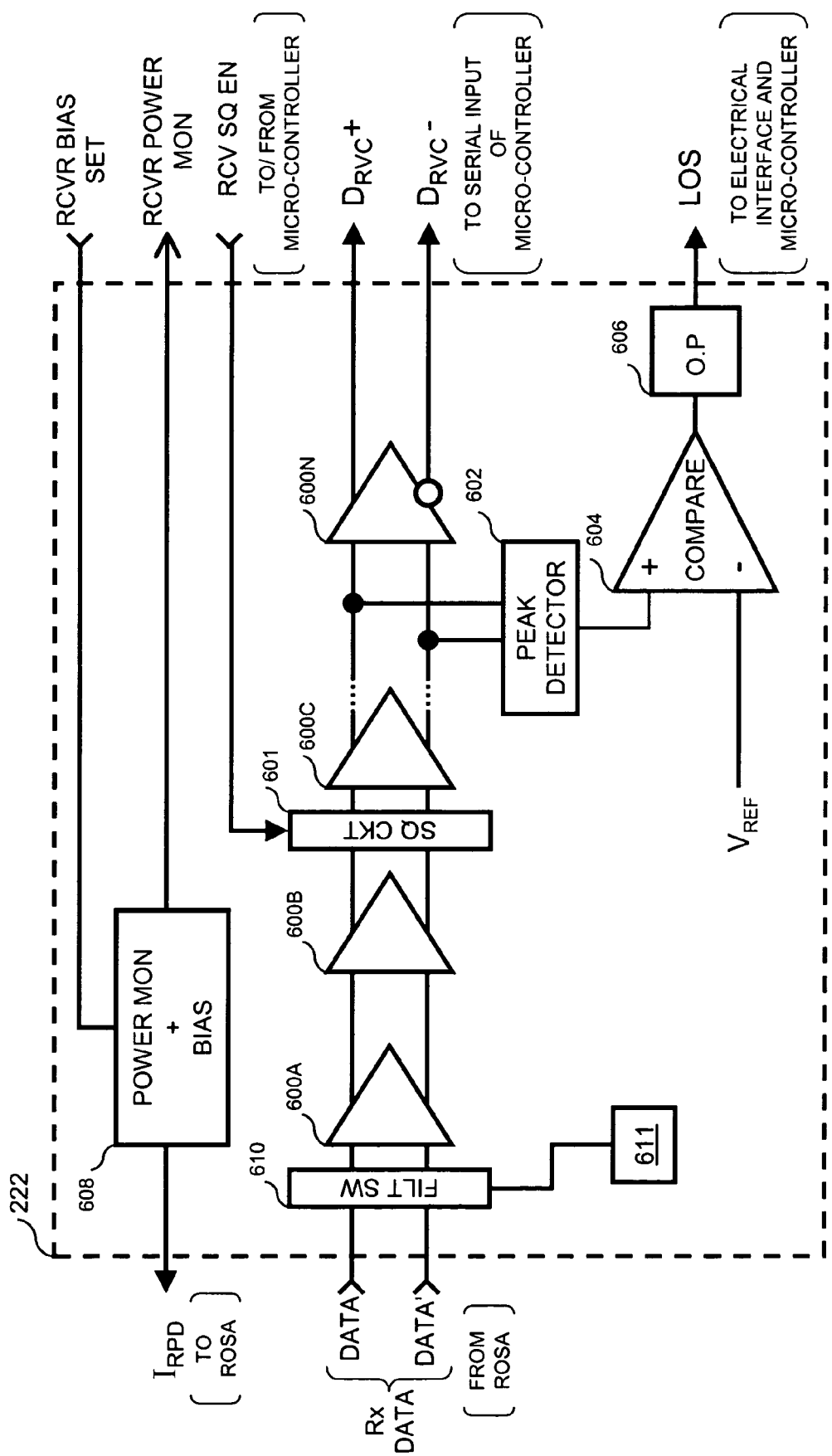
FIG. 6 is a functional block diagram of the limiting amplifier (LA) 222 of the integrated circuit 100.

Referring now to FIG. 6, a functional block diagram of the LA 222 is illustrated. The LA 222 includes a series of a plurality of differential amplifiers 600A–600N to amplify the received data RXDATA from the ROSA. The received data RXDATA from the optical link is a serial data stream or pattern of data bits typically having an irregular level of voltage amplitude. The plurality of differential amplifiers 600A–600N amplify the RXDATA from the ROSA into regular digital levels of voltage amplitude that can be coupled to micro-controller of the monitor/controller 223.

The LA 222 may further include a squelch circuit 601 between a pair of the series of a plurality of differential amplifiers 600A–600N to amplify the received data RXDATA from the ROSA. When enabled by the RCV squelch enable signal from the monitor/controller 223, the squelch circuit 601 functions to suppress the switching of received differential data outputs DRCV+ and DRCV− coupled to the monitor/controller 223 when an irregular low voltage amplitude is received below a pre-determined level.

The LA 222 further includes a peak detector 602, a comparator 604, and an output driver 606 to generate a loss of signal flag. If the peak detector does not generate a voltage level greater than the reference voltage input into the comparator 604, the output driver 606 generates the LOS flag output. The reference voltage input VREF coupled into the peak detector 604 can be set by the micro-controller 500 and establishes a floor where data is recognizable by the ROSA.

In one embodiment, the limiting amplifier 222 operates over a wide range of data rates from 100 mega-bits per second (Mbps) through 4.5 giga-bits per second (Gbps). In another embodiment, the limiting amplifier 222 operates over data rates from 1 giga-bits per second (Gbps) through 4.5 Gbps.

The limiting amplifier is flexible in that it can selectively coupled to an external passive filter in order to support different data rates. The limiting amplifier 222 may include a filter switch 610 that is selected by a rate selection pin 611, one of the pins 120 of the integrated circuit 100. The rate selection pin 611 logically controls the filter switch 610 to select whether or not a bandwidth limiting filter is coupled into the series of amplifiers 600A–600N. In one embodiment, the rate selection pin 612 is used to switch in a bandwidth limiting filter to operate the limiting amplifier 222 at a data rate of less than 2.5 giga-bits per second (Gbps). In another embodiment, the rate selection pin 612 is used to switch in a bandwidth limiting filter to operate the limiting amplifier 222 at a data rate of less than 1.3 giga-bits per second (Gbps).

The LA 222 further includes a power monitor and bias circuit 608. The power monitor and bias circuit 608 sets the current into the photodetector of the ROSA and monitors the received optical power by the ROSA. A receiver bias set is coupled into power monitor and bias circuit 608 from the monitor/controller 223 to calibrate and compensate for the current IRPD. The power monitor and bias circuit 608 generates the receiver power monitor signal which is coupled into the micro-controller 500. The receiver power monitor signal represents the average optical power received by the ROSA. The operation of the power monitor and bias circuit 608 and exemplary circuit schematics therefor are more fully described in U.S. patent application Ser. Nos. 10/367,322 and 10/367,501 filed by David Lewis on Feb. 13, 2003.

The laser driver 221 in the single chip 100 is designed to be versatile and flexible to drive semiconductor lasers with a wide variation in threshold current and modulation current. Typically, a vertical cavity surface emitting laser (VCSEL) requires lower DC bias current and lower modulation current while a Fabry-Perot (FP) laser or a distributed feedback (DFB) laser requires a higher DC bias current and a higher modulation current. An LED may not require any DC bias. Conventional laser drivers cannot accommodate both types of driving conditions, and thus two different laser drivers are needed. The laser driver 221 in the integrated chip 100 has all driving conditions designed into it in order to provide various driving modes in the same chip 100, one mode for driving VCSELs and another mode for driving FP and DFB lasers.

Figure 7:
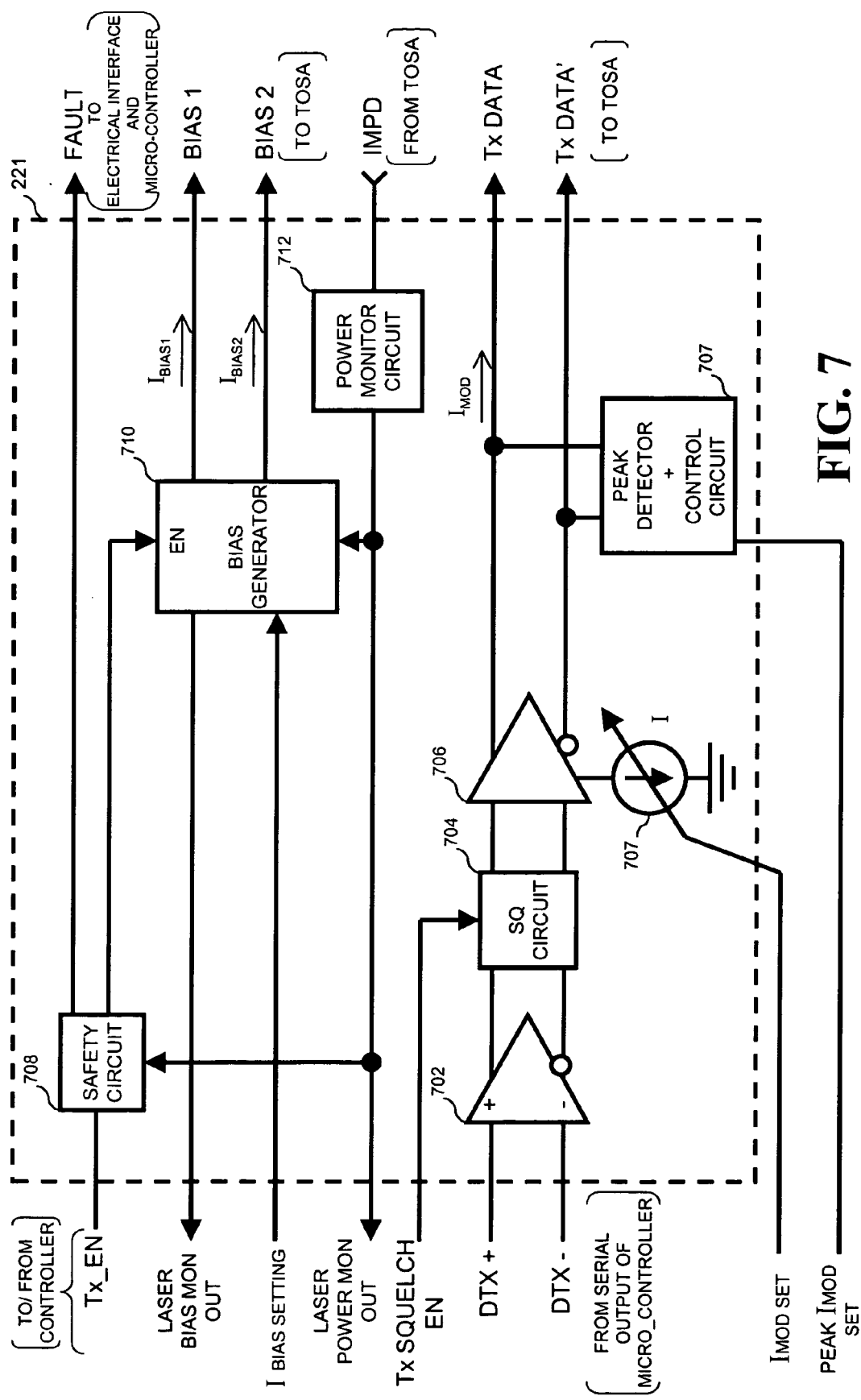
FIG. 7 is a functional block diagram of the laser driver (LDD) 221 of the integrated circuit 100.

Referring now to FIG. 7, a functional block diagram of the laser driver 221 is illustrated. Coupled in series together, the laser driver 221 includes a receiver 702 and a modulation driver 706 with variable current source 707 to modulate data into the semiconductor laser of the TOSA and onto the optical signal. The monitor/controller 223 establishes a modulation current setting IMOD set input that varies the current generated by the variable current source 707 in order to achieve a desirable average optical power output level.

The laser driver 221 may further include a squelch circuit 704, coupled between the receiver 702 and the modulation driver 706. When enabled by the TX squelch enable signal from the monitor/controller 223, the squelch circuit 704 functions to suppress the modulation of data out to the semiconductor laser when an irregular low voltage amplitude is received below a pre-determined level.

The laser driver 221 may further include a peak detector and control circuit 706 coupled to the output of the modulation driver 706 to detect and control the peak modulation current into the semiconductor laser of the TOSA. In response to a peak modulation current setting IMOD peak from the monitor/controller 223, the peak detector and control circuit 706 limits the level of modulation current into the semiconductor laser.

The laser driver 221 further includes a bias generator 710 and a power monitoring circuit 712. The bias generator 710 generates a plurality of bias current outputs to provide an appropriate range of bias current for different semiconductor lasers previously described. The bias current may be set near the threshold level of the specific semiconductor laser. Bias 1 output may be the selected output bias current range for a VCSEL. Bias 2 output may be the selected output bias current range for a DFB or FP laser. In either case, the range of bias current can be fine tuned by the monitor/controller 223 through the IBIAS setting input. The bias generator 710 further generates a laser bias monitoring output signal for monitoring the level of bias to the semiconductor laser and may for part of a feedback loop to compensate for variations in the bias current.

In one embodiment, the laser driver 221 operates over a wide range of data rates from 100 mega-bits per second (Mbps) through 4.5 giga-bits per second (Gbps).

The power monitoring circuit 712 receives the monitoring photodiode current IMPD and generates a measure of the optical power output from the semiconductor laser. The measure of the optical power output is coupled into the safety circuit and the monitor/controller 223 for monitoring purposes. Optionally in the case of an analog feedback loop for automatic power control (APC), the measure of optical power output from the semiconductor laser is also coupled into the bias generator. In the case of a digital feedback loop for automatic power control (APC, the IBIAS setting can be adjusted by the monitor/controller 223 in response to the laser power monitor output.

The laser driver 221 may further include a safety circuit 708 to generate a fault flag as a portion of the electrical interface. In the case there is an over power condition detected by the safety circuit, the bias generator 710 is disabled to reduce the current flowing in the semiconductor laser and the fault flag is set. The fault flag is also coupled into the monitor/controller 223 as one of the operating parameters of the optical transceiver.

Figure 8:
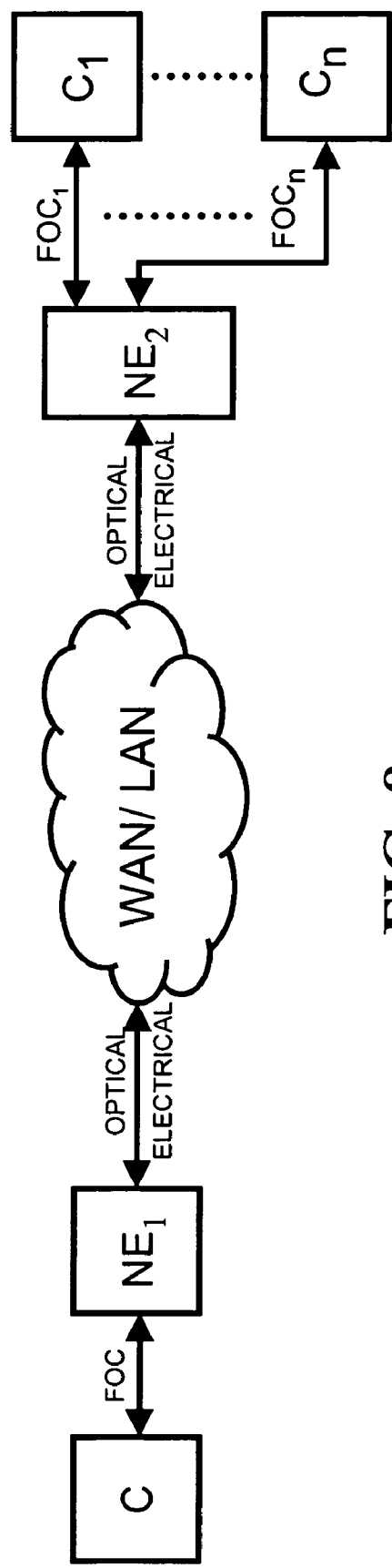
FIG. 8 is a block diagram of a communication system incorporating the invention.

Referring now to FIG. 8, a communication system incorporating the invention is illustrated. A wide area network WAN or a local area network LAN is coupled between network equipment 1 NE1 and network equipment 2 NE2. The network equipment 1 NE1 and network equipment 2 NE2 may couple to the network by means of an optical or an electrical coupling. A computer C couples to the network equipment 1 NE1.

Figure 9:
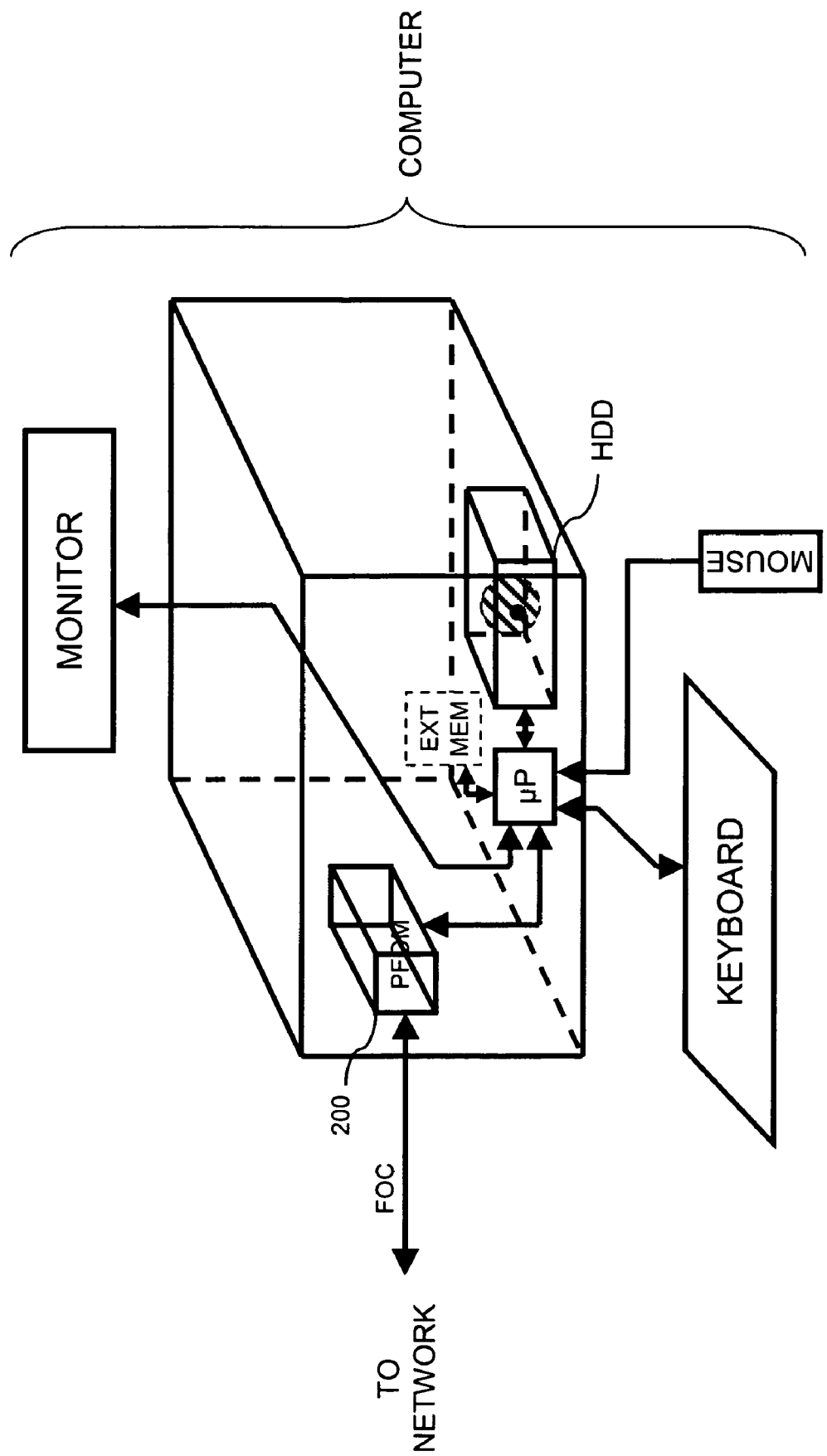
FIG. 9 is a block diagram of a computer incorporating the invention.

Referring now to FIG. 9, a block diagram of an exemplary computer C incorporating the invention is illustrated. The computer C includes a monitor, a keyboard and or other I/O device such as the mouse, and the central processor. The central processor include a fiber optic module (i.e., the optical transceiver 200 described previously with the integrated circuit 100) ("PFOM") coupled to a micro-processor (UP). Further coupled to the UP are a hard disk drive (HDD), an optional external memory, the monitor, the keyboard, and the mouse. The UP may communicate with the optical transceiver 200 in order to obtain status and operational parameters regarding the operation of the optical transceiver and to transceive data over the optical data link (i.e., the fiber optic cable FOC) by means of the optical transceiver. The UP may use the same or another algorithm program to perform calibration, monitoring, and advanced replacement.

With the single integrated circuit chip 100 reducing power consumption and the area required for the PCB of the ESA, a lower power and higher density optical transceiver may be achieved so that the PFOM may be more readily used in a battery operated laptop computer.

Figure 10:
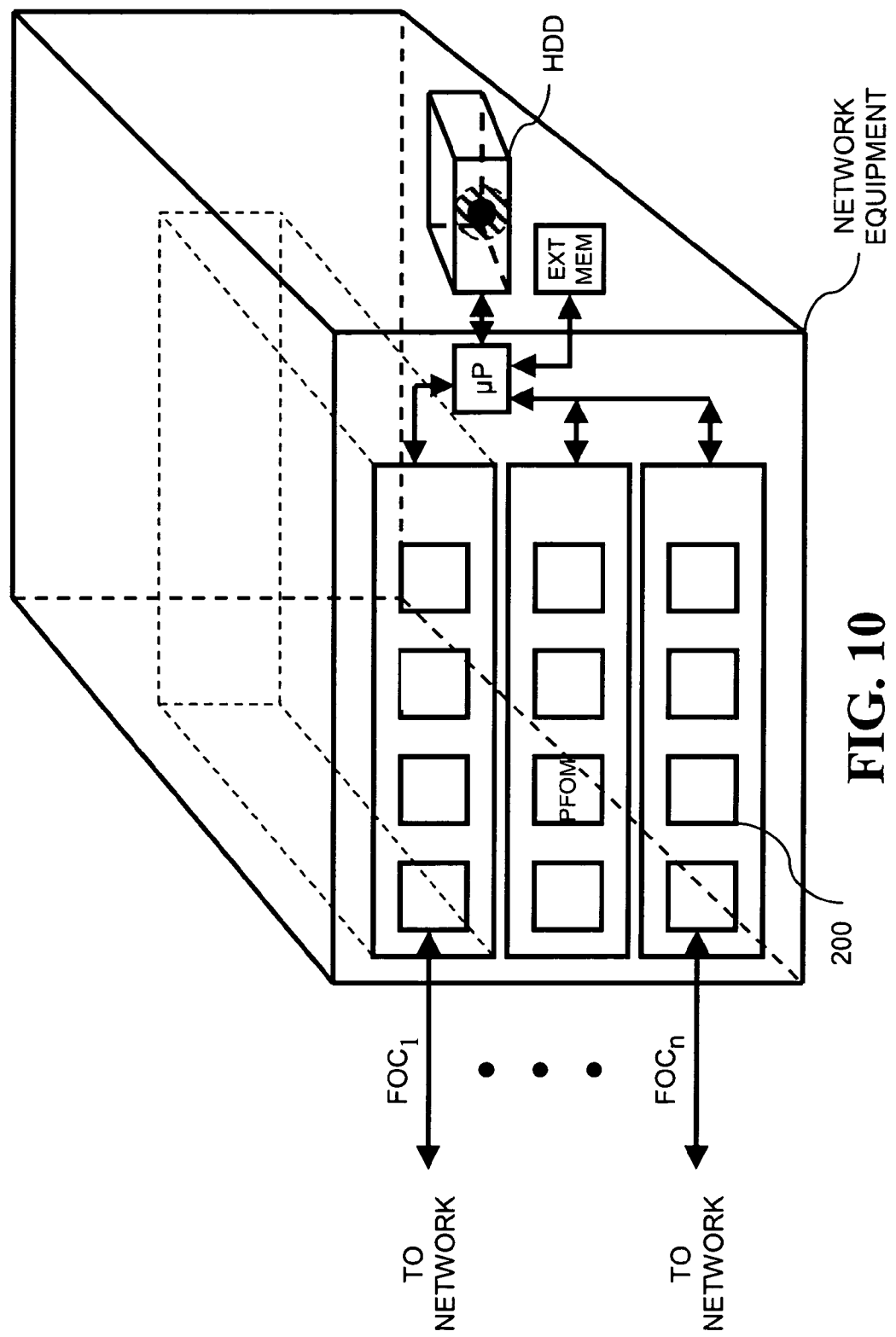
FIG. 10 is a block diagram of exemplary network equipment incorporating the invention.

Referring now to FIG. 10, a block diagram of exemplary network equipment incorporating the invention is illustrated. The network equipment may include a router, a hub, an optical switch, an electro-optical switch, or a fiber optic modem, for example. The network equipment illustrated in FIG. 10 may be exemplary of optical or opto-electrical network equipment NE1 and NE2 illustrated in FIG. 8. The network equipment includes one or more fiber optic modules (i.e., the optical transceiver 200 described previously with the integrated circuit 100). The fiber optic modules may be pluggable fiber optic modules ("PFOM") with a plug connection to couple to the host or fixed solderable type of fiber optic modules with pins to solder to be soldered to the host system. Each of the one or more fiber optic modules couples to one or more fiber optic cables FOC1–FOCN to make one or more optical data links to the network. The one or more fiber optic modules are coupled to a micro-processor (UP) of the NE. Further coupled to the UP are a hard disk drive (HDD) and optional external memory. The UP may communicate with the one or more PFOMs (optical transceivers 200) in order to obtain status and operational parameters regarding the operation of each and to transceive data over the one or more optical data links to the network by means of the optical transceiver. The UP may use the same or another algorithm program to perform calibration, monitoring, and advanced replacement.

With the single integrated circuit chip 100 reducing the area required for the PCB of the ESA, a higher density optical transceiver may be achieved in order to increase the number of PFOMs in the network equipment.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, the invention may be implemented in hardware, software, firmware or a combination thereof and utilized in systems, subsystems, components or sub-components thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In any case, the invention should not be construed as limited by such embodiments. Rather, the invention should be construed according to the claims that follow below.

What is claimed is:

1. A single integrated circuit chip in an optical transceiver, the single integrated circuit chip comprising:
    a laser driver to generate a DC bias current to bias a semiconductor laser to at least a laser threshold and to generate a modulating current to modulate the semiconductor laser in response to a serial transmission data pattern;
    a limiting amplifier to amplify an irregular low voltage amplitude received signal and to generate a received data signal with a regular voltage amplitude; and
    a micro-controller coupled to the laser driver via an analog feedback loop, and the limiting amplifier via a digital feedback loop, the microcontroller to control and monitor the operation of the laser driver, the analog feedback loop, the digital feedback loop, and the limiting amplifier.

2. The single integrated circuit chip of claim 1, wherein the laser driver is controlled by the micro-controller to maintain a constant average laser output power and to compensate for operational temperature variations and laser aging.

3. The single integrated circuit chip of claim 1, wherein the laser driver is controlled by the micro-controller to operate the semiconductor laser at a pre-determined extinction ratio in response to operational temperature variations and laser aging.

4. The single integrated circuit chip of claim 1, wherein the limiting amplifier generates an output differential data output with output levels of one of the set of current mode logic (CML) and positive emitter coupled logic (PECL).

5. The single integrated circuit chip of claim 1, wherein the limiting amplifier detects a loss of signal in the irregular low voltage amplitude received signal and in response generates a loss of signal flag output with output levels of one of the set of transistor—transistor logic (TTL) levels and positive emitter coupled logic (PECL) levels.

6. The single integrated circuit chip of claim 1, wherein the limiting amplifier includes a squelch function to suppress an output differential data output when the irregular low voltage amplitude received signal is below a pre-determined level.

7. The single integrated circuit chip of claim 1, wherein the micro-controller is programmed with instructional code to provide operational status of the optical transceiver.

8. The single integrated circuit chip of claim 7, wherein the operation status of the optical transceiver includes one or more monitored transceiver parameters of the set of laser average output power, laser bias current, received optical power by a photodiode in said transceiver, transceiver bias voltage, and transceiver operation temperature.

9. The single integrated circuit chip of claim 8, wherein the micro-controller is programmed to provide a warning and a flag output to indicate the failing of one or more of the monitored transceiver parameters.

10. The single integrated circuit chip of claim 8, wherein the micro-controller has a communication interface to communicate with a host system.

11. The single integrated circuit chip of claim 10, wherein the communication interface is a serial communication interface.

12. The single integrated circuit chip of claim 1, wherein the laser driver is a variable laser driver having a wide driving flexibility and can be set to drive one of a plurality of semiconductor lasers.

13. The single integrated circuit chip of claim 12, wherein the variable laser driver can be set to drive one of a vertical cavity surface emitting laser (VCSEL), a Fabry-Perot (FP) laser, and a distributed feedback (DFB) laser.

14. The single integrated circuit chip of claim 1, wherein the laser driver operates over a wide range of data rates from 100 mega-bits per second (Mbps) through 4.5 giga-bits per second (Gbps).

15. The single integrated circuit chip of claim 1, wherein the limiting amplifier operates over a wide range of data rates from 100 mega-bits per second (Mbps) through 4.5 giga-bits per second (Gbps).

16. The single integrated circuit chip of claim 15, wherein the limiting amplifier operates over data rates from 1 giga-bits per second (Gbps) through 4.5 Gbps.

17. The single integrated circuit chip of claim 16, wherein the limiting amplifier has a rate selection pin to switch in a bandwidth limiting filter to operate at a data rate of less than 2.5 giga-bits per second (Gbps).

18. The single integrated circuit chip of claim 16, wherein the limiting amplifier has a rate selection pin to switch in a bandwidth limiting filter to operate at a data rate of less than 1.3 giga-bits per second (Gbps).

19. A single integrated circuit chip in an optical transceiver, the single integrated circuit chip comprising:
    a laser driver to generate a DC bias current to bias a semiconductor laser to at least a laser threshold and to generate a modulating current to modulate the semiconductor laser in response to a serial transmission data pattern;
    a limiting amplifier to amplify an irregular low voltage amplitude received signal and to generate a received data signal with a regular voltage amplitude; and
    a micro-controller coupled to the laser driver and the limiting amplifier, the microcontroller to control and monitor the operation of the laser driver and the limiting amplifier;
    wherein the laser driver has a selectable output mode including a first output mode and a second output mode, the output mode being selected in response to the selection of laser diode and the connection between packaging pins of the single integrated circuit chip and pins of the laser diode.

20. The single integrated circuit chip of claim 19, wherein the first output mode of the laser driver is to drive vertical cavity surface emitting lasers, and
    the second output mode of the laser driver is to drive Fabry-Perot (FP) lasers and distributed feedback (DFB} lasers.

* * * * *